US007083355B2

(12) United States Patent
Jensen et al.

(10) Patent No.: US 7,083,355 B2
(45) Date of Patent: Aug. 1, 2006

(54) STIRRUP SUPPORT INDEXER FOR A MEDICAL EXAMINATION TABLE

(75) Inventors: Mark E. Jensen, Sheboygan, WI (US); John E. Habermann, St. Francis, WI (US)

(73) Assignee: The Brewer Company, LLC, Menomonee Falls, WI (US)

(*) Notice: Subject to any disclaimer, the term of this patent is extended or adjusted under 35 U.S.C. 154(b) by 122 days.

(21) Appl. No.: 10/671,910

(22) Filed: Sep. 29, 2003

(65) Prior Publication Data

US 2005/0069377 A1 Mar. 31, 2005

(51) Int. Cl.
*F16C 11/00* (2006.01)

(52) U.S. Cl. ............................ 403/92; 403/95; 403/97; 403/101; 403/85; 5/624; 5/648

(58) Field of Classification Search ................. 403/84, 403/85, 92, 93, 95, 97, 101, 103, 104; 5/621, 5/624, 648–651
See application file for complete search history.

(56) References Cited

U.S. PATENT DOCUMENTS

| | | | | |
|---|---|---|---|---|
| 217,646 | A | 7/1879 | Sherer | |
| 487,625 | A | 12/1892 | Kales | |
| 488,649 | A | 12/1892 | Daggett | |
| 542,060 | A | 7/1895 | Lentz | |
| 1,039,708 | A | 10/1912 | Denquer | |
| 1,650,327 | A | 11/1927 | Conrad | |
| 1,684,889 | A | 9/1928 | Russ | |
| 1,891,629 | A | 12/1932 | Van Wagner | |
| 1,967,422 | A | 7/1934 | Nadelson | |
| 2,120,732 | A | 6/1938 | Comper et al. | |
| 2,267,973 | A | 12/1941 | Demcak | |
| 2,272,819 | A | 2/1942 | Poetsch et al. | |
| 2,306,031 | A | 12/1942 | Anderson et al. | |
| 2,538,993 | A | 1/1951 | Travis | |
| 2,565,784 | A | 8/1951 | Sheean | |
| 2,605,151 | A | 7/1952 | Shampaine | |
| 2,606,801 | A | 8/1952 | Shampaine | |
| D170,305 | S | 9/1953 | Claus | |
| 2,652,887 | A | 9/1953 | Fitzgerald | |
| 2,659,902 | A | 11/1953 | Fitzgerald et al. | |
| 2,679,445 | A | 5/1954 | Roehm | |
| 2,682,671 | A | 7/1954 | Faure | |
| 2,788,529 | A | 4/1957 | Moritzacky et al. | |
| 2,801,142 | A * | 7/1957 | Adams | 5/646 |
| 2,941,215 | A | 6/1960 | Johnson | |
| 3,016,275 | A | 1/1962 | Grant | |
| 3,041,121 | A | 6/1962 | Comper | |
| 3,100,129 | A * | 8/1963 | Adolphson | 297/423.22 |
| D202,963 | S | 11/1965 | Dailey | |
| 3,215,834 | A | 11/1965 | Tayman | |
| D204,222 | S | 3/1966 | Dailey | |
| 3,281,141 | A | 10/1966 | Smiley et al. | |

(Continued)

*Primary Examiner*—Daniel P. Stodola
*Assistant Examiner*—Michael P. Ferguson
(74) *Attorney, Agent, or Firm*—Ryan Kromholz & Manion S.C.

(57) ABSTRACT

An indexer for positioning a limb extension bar used with an examination table. The indexer permits a selective fixed position in the forward and backward directions and a selective fixed position with respect to rotational movement. The indexer consists of a housing and a translator that sits within the housing. A locking member sits within the translator. The locking member has meshing teeth that mate with a similar structure located on the housing to selectively fix the extension bar in a desired position.

15 Claims, 9 Drawing Sheets

U.S. PATENT DOCUMENTS

| | | | | |
|---|---|---|---|---|
| D207,081 | S | 2/1967 | Katzfey et al. | |
| D207,483 | S | 4/1967 | Dottinger | |
| 3,334,951 | A | 8/1967 | Douglas, Jr. et al. | |
| 3,348,893 | A | 10/1967 | Katzfey et al. | |
| 3,355,163 | A | 11/1967 | Leinassar | |
| 3,409,287 | A | 11/1968 | Chervenka | |
| 3,411,766 | A | 11/1968 | Lanigan | |
| 3,413,663 | A | 12/1968 | Swann | |
| 3,452,977 | A | 7/1969 | Ryman | |
| 3,499,529 | A | 3/1970 | Katzfey et al. | |
| 3,638,935 | A | 2/1972 | Lelugas et al. | |
| 3,658,317 | A | 4/1972 | Bartlett et al. | |
| 3,724,004 | A | 4/1973 | Behrens | |
| 3,754,749 | A | 8/1973 | Lyon et al. | |
| 3,814,414 | A | 6/1974 | Chapa | |
| 3,817,512 | A * | 6/1974 | Torrey | 5/632 |
| 3,851,870 | A | 12/1974 | Cook | |
| 3,868,103 | A | 2/1975 | Pageot et al. | |
| 3,905,591 | A | 9/1975 | Schorr et al. | |
| 3,944,205 | A | 3/1976 | Mueller | |
| 3,947,686 | A | 3/1976 | Cooper et al. | |
| 3,967,128 | A | 6/1976 | Smulewicz | |
| 3,997,792 | A | 12/1976 | Conrad et al. | |
| 4,003,704 | A | 1/1977 | Zurolo et al. | |
| 4,034,972 | A | 7/1977 | Peterson | |
| D245,287 | S | 8/1977 | Damico et al. | |
| 4,045,078 | A | 8/1977 | Shine | |
| 4,057,240 | A | 11/1977 | Damico et al. | |
| 4,076,230 | A | 2/1978 | Pike | |
| D250,043 | S | 10/1978 | Shine | |
| 4,148,472 | A | 4/1979 | Rais et al. | |
| 4,168,099 | A | 9/1979 | Jacobs et al. | |
| 4,180,002 | A | 12/1979 | Huempfner | |
| 4,183,596 | A | 1/1980 | Greene et al. | |
| 4,186,917 | A | 2/1980 | Rais et al. | |
| 4,221,371 | A | 9/1980 | Kuphal | |
| 4,284,268 | A | 8/1981 | Gauthier | |
| 4,287,422 | A | 9/1981 | Kuphal et al. | |
| D263,777 | S | 4/1982 | Thompson | |
| 4,322,899 | A | 4/1982 | Clune | |
| D265,241 | S | 6/1982 | Patterson | |
| D265,242 | S | 6/1982 | Patterson | |
| D266,023 | S | 8/1982 | McLachlan | |
| D266,765 | S | 11/1982 | Clune | |
| 4,383,351 | A | 5/1983 | Fenwick | |
| 4,407,687 | A | 10/1983 | Mitchell | |
| 4,464,780 | A | 8/1984 | Ruiz | |
| 4,501,414 | A | 2/1985 | Mason et al. | |
| 4,506,872 | A | 3/1985 | Westerberg et al. | |
| 4,508,387 | A | 4/1985 | Gilbert et al. | |
| D278,668 | S | 5/1985 | Simpkins | |
| 4,516,805 | A | 5/1985 | Leeper et al. | |
| 4,529,185 | A | 7/1985 | Gutierres | |
| 4,540,165 | A | 9/1985 | Green et al. | |
| 4,545,628 | A | 10/1985 | Richey | |
| 4,547,092 | A | 10/1985 | Vetter et al. | |
| 4,552,403 | A | 11/1985 | Yindra | |
| 4,557,471 | A | 12/1985 | Pazzini | |
| 4,558,857 | A | 12/1985 | Heller | |
| D282,398 | S | 1/1986 | Yindra | |
| 4,586,398 | A | 5/1986 | Yindra | |
| 4,586,762 | A | 5/1986 | Kennedy et al. | |
| 4,589,124 | A | 5/1986 | Ruiz | |
| 4,589,642 | A | 5/1986 | Schnelle et al. | |
| 4,600,248 | A | 7/1986 | Pflieger | |
| 4,602,756 | A | 7/1986 | Chatfield | |
| 4,606,575 | A | 8/1986 | Kodet | |
| 4,608,812 | A | 9/1986 | Wilson | |
| D286,481 | S | 11/1986 | Case et al. | |
| 4,653,129 | A | 3/1987 | Kuck et al. | |
| 4,665,574 | A | 5/1987 | Filips et al. | |
| 4,667,354 | A | 5/1987 | Carey, Jr. et al. | |
| 4,667,605 | A | 5/1987 | Bastian | |
| 4,691,393 | A | 9/1987 | Kuck | |
| 4,700,916 | A | 10/1987 | Bastian et al. | |
| 4,716,840 | A | 1/1988 | Tringali et al. | |
| 4,717,102 | A | 1/1988 | Pflieger | |
| 4,732,089 | A | 3/1988 | Mueller | |
| 4,732,430 | A | 3/1988 | Byrns | |
| 4,750,305 | A | 6/1988 | Bastian | |
| 4,752,977 | A | 6/1988 | Smith et al. | |
| 4,761,000 | A | 8/1988 | Fisher et al. | |
| D297,597 | S | 9/1988 | Simpkins et al. | |
| 4,796,846 | A | 1/1989 | Meier et al. | |
| 4,805,365 | A | 2/1989 | Bastian | |
| D300,657 | S | 4/1989 | Simpkins et al. | |
| 4,819,569 | A | 4/1989 | Bastian et al. | |
| 4,821,350 | A | 4/1989 | Feldt | |
| D300,997 | S | 5/1989 | Simpkins et al. | |
| 4,826,117 | A | 5/1989 | Bastian et al. | |
| 4,826,221 | A | 5/1989 | Harmon | |
| D301,925 | S | 6/1989 | Simpkins et al. | |
| 4,846,431 | A | 7/1989 | Pflieger | |
| 4,852,941 | A | 8/1989 | Jones | |
| 4,858,260 | A | 8/1989 | Failor et al. | |
| 4,865,303 | A | 9/1989 | Hall | |
| 4,872,656 | A | 10/1989 | Brendgord et al. | |
| 4,872,657 | A | 10/1989 | Lussi | |
| 4,905,266 | A | 2/1990 | Kuck et al. | |
| 4,913,413 | A | 4/1990 | Raab | |
| 4,916,725 | A | 4/1990 | Quinter et al. | |
| 4,937,902 | A | 7/1990 | Ceike Shapiro | |
| 4,956,592 | A | 9/1990 | Schulte et al. | |
| 4,958,816 | A | 9/1990 | Chaney et al. | |
| 4,961,610 | A | 10/1990 | Reeder et al. | |
| 4,966,351 | A | 10/1990 | Klepacki | |
| 4,968,013 | A | 11/1990 | Kuck | |
| 4,973,034 | A | 11/1990 | Michele | |
| 4,989,848 | A | 2/1991 | Monroe | |
| 4,995,067 | A | 2/1991 | Royster et al. | |
| 4,996,731 | A | 3/1991 | Kruyt | |
| 5,005,667 | A | 4/1991 | Anderson | |
| 5,016,268 | A | 5/1991 | Lotman | |
| D319,158 | S | 8/1991 | Jones et al. | |
| 5,037,053 | A | 8/1991 | Fox et al. | |
| D321,097 | S | 10/1991 | Jones et al. | |
| 5,078,349 | A | 1/1992 | Smith | |
| 5,081,808 | A | 1/1992 | Bastian et al. | |
| 5,084,927 | A | 2/1992 | Parkevich | |
| D326,381 | S | 5/1992 | Heiligenthal et al. | |
| 5,157,787 | A | 10/1992 | Donnellan et al. | |
| D330,771 | S | 11/1992 | Chaney et al. | |
| D330,813 | S | 11/1992 | Spitzer et al. | |
| 5,166,968 | A | 11/1992 | Morse | |
| 5,203,135 | A | 4/1993 | Bastian | |
| D335,409 | S | 5/1993 | Kellems | |
| 5,208,928 | A | 5/1993 | Kuck et al. | |
| 5,223,229 | A | 6/1993 | Brucker | |
| 5,231,719 | A | 8/1993 | Schnelle | |
| D341,737 | S | 11/1993 | Shepherd | |
| 5,269,326 | A | 12/1993 | Verrier | |
| 5,279,011 | A | 1/1994 | Schnelle | |
| D344,802 | S | 3/1994 | Kuck et al. | |
| D345,266 | S | 3/1994 | Koguma | |
| 5,329,657 | A | 7/1994 | Bartley et al. | |
| 5,339,750 | A | 8/1994 | Smies | |
| 5,345,632 | A | 9/1994 | Langenaeken et al. | |
| 5,348,375 | A | 9/1994 | Steininger | |
| 5,369,825 | A | 12/1994 | Reesby | |
| 5,369,827 | A | 12/1994 | Parke et al. | |
| 5,403,549 | A | 4/1995 | McNeil et al. | |
| 5,426,795 | A | 6/1995 | Harty | |
| D361,438 | S | 8/1995 | Spencer et al. | |
| D365,224 | S | 12/1995 | Pohlman | |

| | | | |
|---|---|---|---|
| 5,472,270 A | | 12/1995 | Czarnecky et al. |
| 5,496,105 A | | 3/1996 | Czarnecky et al. |
| 5,507,050 A | | 4/1996 | Welner |
| D370,572 S | | 6/1996 | Lin |
| 5,528,782 A | | 6/1996 | Pfeuffer et al. |
| 5,538,215 A | | 7/1996 | Hosey |
| 5,564,662 A | | 10/1996 | Lussi et al. |
| 5,564,663 A | | 10/1996 | Cook et al. |
| 5,565,834 A | | 10/1996 | Hanley et al. |
| 5,568,209 A | | 10/1996 | Priester et al. |
| 5,568,817 A | | 10/1996 | Harty |
| D378,961 S | | 4/1997 | Nordstrom et al. |
| D379,409 S | | 5/1997 | Schwaegerle et al. |
| 5,628,078 A | | 5/1997 | Pennington et al. |
| 5,638,644 A | | 6/1997 | Bastian |
| 5,645,313 A | | 7/1997 | Best et al. |
| 5,655,238 A | | 8/1997 | Stickley et al. |
| 5,660,405 A | | 8/1997 | Campbell |
| 5,661,859 A | | 9/1997 | Schaefer |
| 5,678,267 A | | 10/1997 | Kinder |
| 5,680,957 A | | 10/1997 | Liu |
| D386,634 S | | 11/1997 | Daugs |
| 5,689,999 A | * | 11/1997 | Wiley et al. .................. 74/527 |
| 5,706,678 A | | 1/1998 | Sasaki |
| 5,754,997 A | | 5/1998 | Lussi et al. |
| 5,771,513 A | | 6/1998 | Kirchgeorg et al. |
| 5,781,943 A | | 7/1998 | Moenning et al. |
| 5,855,207 A | | 1/1999 | Moenning et al. |
| 5,860,899 A | | 1/1999 | Rassman |
| D404,945 S | | 2/1999 | Simpkins et al. |
| D408,537 S | | 4/1999 | Stickley et al. |
| D408,538 S | | 4/1999 | Simpkins et al. |
| D408,539 S | | 4/1999 | Simpkins |
| 5,913,773 A | | 6/1999 | Cox |
| 5,919,131 A | | 7/1999 | Smoler et al. |
| 5,924,960 A | | 7/1999 | Cohen |
| 5,926,876 A | | 7/1999 | Haigh et al. |
| 5,953,773 A | | 9/1999 | Asada et al. |
| D417,098 S | | 11/1999 | Teufel et al. |
| D417,571 S | | 12/1999 | Teufel et al. |
| D418,225 S | | 12/1999 | Simpkins et al. |
| D420,225 S | | 2/2000 | Lamb et al. |
| 6,023,800 A | | 2/2000 | Stickley |
| 6,038,718 A | | 3/2000 | Pennington et al. |
| 6,073,284 A | | 6/2000 | Borders |
| D428,629 S | | 7/2000 | Cohen |
| 6,101,652 A | | 8/2000 | Matern, Jr. |
| 6,106,065 A | | 8/2000 | Carroll |
| 6,115,978 A | | 9/2000 | Bastian et al. |
| 6,131,214 A | | 10/2000 | Moenning et al. |
| 6,173,461 B1 | | 1/2001 | Alexander |
| 6,202,230 B1 | | 3/2001 | Borders |
| 6,209,463 B1 | | 4/2001 | Koharchik et al. |
| 6,212,713 B1 | | 4/2001 | Kuck et al. |
| 6,230,343 B1 | | 5/2001 | Buiskool et al. |
| 6,237,172 B1 | | 5/2001 | Morgan, Sr. |
| 6,240,579 B1 | | 6/2001 | Hanson et al. |
| 6,256,812 B1 | | 7/2001 | Bartow et al. |
| 6,264,006 B1 | | 7/2001 | Hanson et al. |
| 6,276,012 B1 | | 8/2001 | Borders |
| 6,289,537 B1 | | 9/2001 | Hopper et al. |
| 6,295,671 B1 | | 10/2001 | Reesby et al. |
| 6,345,193 B1 | | 2/2002 | Dutto et al. |
| 6,351,678 B1 | | 2/2002 | Borders |
| 6,353,949 B1 | | 3/2002 | Falbo |
| 6,363,555 B1 | | 4/2002 | LaRose |
| 6,374,133 B1 | | 4/2002 | Dutto et al. |
| 6,382,725 B1 | | 5/2002 | Carroll |
| D458,780 S | | 6/2002 | Siepmann et al. |
| D461,899 S | | 8/2002 | Siepmann et al. |
| D461,900 S | | 8/2002 | Siepmann et al. |
| D462,189 S | | 9/2002 | Brockway et al. |
| D462,445 S | | 9/2002 | Barde et al. |
| D462,674 S | | 9/2002 | Siepmann et al. |
| D463,861 S | | 10/2002 | Siepmann et al. |
| 6,505,364 B1 | | 1/2003 | Simmons et al. |
| D473,312 S | | 4/2003 | Cook |
| 6,546,577 B1 | | 4/2003 | Chinn |
| 6,550,084 B1 | | 4/2003 | Siepmann et al. |
| 6,568,008 B1 | | 5/2003 | Siepmann et al. |
| 6,638,299 B1 | | 10/2003 | Cox |
| 6,651,279 B1 | | 11/2003 | Muthuvelan |
| 6,659,556 B1 | | 12/2003 | Pellerin |
| 6,678,908 B1 | | 1/2004 | Borders et al. |
| 6,681,423 B1 | | 1/2004 | Zachrisson |
| 6,739,006 B1 | | 5/2004 | Borders et al. |
| 6,754,923 B1 | | 6/2004 | Borders et al. |
| 6,769,145 B1 | | 8/2004 | Pfeuffer et al. |
| D496,462 S | | 9/2004 | Walters et al. |
| 6,802,564 B1 | | 10/2004 | Brockway et al. |
| 6,832,398 B1 | | 12/2004 | Borders et al. |
| 6,857,147 B1 | | 2/2005 | Somasundaram |
| 6,886,199 B1 | | 5/2005 | Schwaegerle |
| 6,886,200 B1 | | 5/2005 | Blyshak et al. |
| 2001/0000363 A1 | | 4/2001 | Borders |
| 2001/0003789 A1 | | 6/2001 | Dutto et al. |
| 2002/0000008 A1 | | 1/2002 | Borders |
| 2002/0170115 A1 | | 11/2002 | Borders et al. |
| 2002/0170116 A1 | | 11/2002 | Borders et al. |
| 2003/0061662 A1 | | 4/2003 | Strobel et al. |
| 2003/0071503 A1 | | 4/2003 | Brockway et al. |
| 2003/0074735 A1 | | 4/2003 | Zachrisson |
| 2003/0145383 A1 | | 8/2003 | Schwaegerle |
| 2004/0068797 A1 | | 4/2004 | Smith et al. |
| 2004/0074002 A1 | | 4/2004 | Bannister |
| 2004/0074003 A1 | | 4/2004 | Bannister |
| 2004/0098804 A1 | | 5/2004 | Varadharajulu et al. |
| 2004/0133979 A1 | | 7/2004 | Newkirk et al. |
| 2004/0172756 A1 | | 9/2004 | Somasundaram |
| 2004/0172757 A1 | | 9/2004 | Somasundaram |
| 2005/0015878 A1 | | 1/2005 | Bannister et al. |

* cited by examiner

STIRRUP SUPPORT INDEXER FOR A MEDICAL EXAMINATION TABLE

BACKGROUND OF THE INVENTION

The present invention relates generally to medical examination tables and more specifically to movement and positioning control devices for limb support members and stirrups.

Many examination tables are equipped with limb support members, most notably leg support members. During an examination, different procedures may require that the support members are orientated in different arrangements. Similarly, different patients may require different lengths that the support members are extended to comfortably support the patient's limb. Likewise, the width between a patient's legs may need to be adjusted. For instance, a patient with an injured hip or leg may need the support moved to a wider position away from the other limb support. While the support members are generally not designed so that the actual support member is adjustable in length or pivotable movement, housing assemblies have been contemplated to allow the support members to have adjustable positions.

An example of such an assembly may be found in Chaney et al. (U.S. Pat. No. 4,958,816). The disclosed housing assembly allows the support member to be adjusted inwardly and outwardly with respect to the examination table. The assembly also allows the support member to rotate in a horizontal direction. The assembly further comprises locking means that lock the support member in any length outwardly from the examination table and also lock the support member in a few predetermined horizontal positions.

Though Chaney et al. discloses an adequate adjustment assembly, there are some shortcomings. For example, Chaney et al. may be adjusted horizontally in only a few preset positions. Also, when the support members are in an extended position, they are not easily moved from such an extended position, as they are fixedly secured in the extended position. Thus, if someone were to accidentally walk into the support member, there is potential for an injury, since the support member will not readily give from the extended position.

The present invention contemplates the above problems and provides an improved assembly unit.

SUMMARY OF THE INVENTION

The present stirrup support indexer assembly unit provides easy movement for a medical stirrup assembly and also allows for an efficient locking mechanism to hold the stirrup assembly in a selected or predetermined position. The stirrup assembly may comprise an elongate extension bar and a stirrup that is attached to a proximate end of the extension bar. The predetermined position may be in any forward or backward direction with respect to an examination table or mount and rotated within a wide range of positions, as well. The unit comprises a housing unit having a base member and spaced apart upright members. Between the spaced apart members sits an index translator. The translator holds a retaining mechanism that has meshing teeth located on its bottom side. The meshing teeth mate with a similar toothed structure located on the base member of the housing unit. The teeth allow the assembly unit and the attached stirrup assembly to be locked in several predetermined positions.

The invention may also be designed with other locking mechanisms instead of the meshing teeth. Tines may be located in the area of one of the upright members to take the place of the meshing teeth, which will provide slots for the extension bar to be held in place. Also, projections located on the translator may interact with counter bores in place of the meshing teeth.

Biasing means, generally comprised of coil springs, and the retaining mechanism, which holds the springs in place, further assists the locking mechanism. The springs and the retaining mechanism sit within an inner chamber of the translator.

The housing unit, the translator and the retainer have aligned through passages that form a channel. The channel allows the extension bar, which may be connected at a proximal end to a stirrup or other limb support device, to rest within the assembly unit. The extension bar may be moved forward and backward and rotated side to side without interference from the locking mechanism. The springs keep the unit in a free position. Once the desired position is located, the weight of a limb resting on the stirrup will compress the springs and lock the bar in place.

The present invention will securely hold an extension bar in place in a selected position, but will also allow easy manipulation from one fixed position to another. This is advantageous as a safety measure. When the bar is in an extended position, it is possible a person may inadvertently walk or bump into the bar. The present assembly will move with such contact, in a manner that will not injure the person or damage the unit. These and other features of the invention will become apparent in the detailed description.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
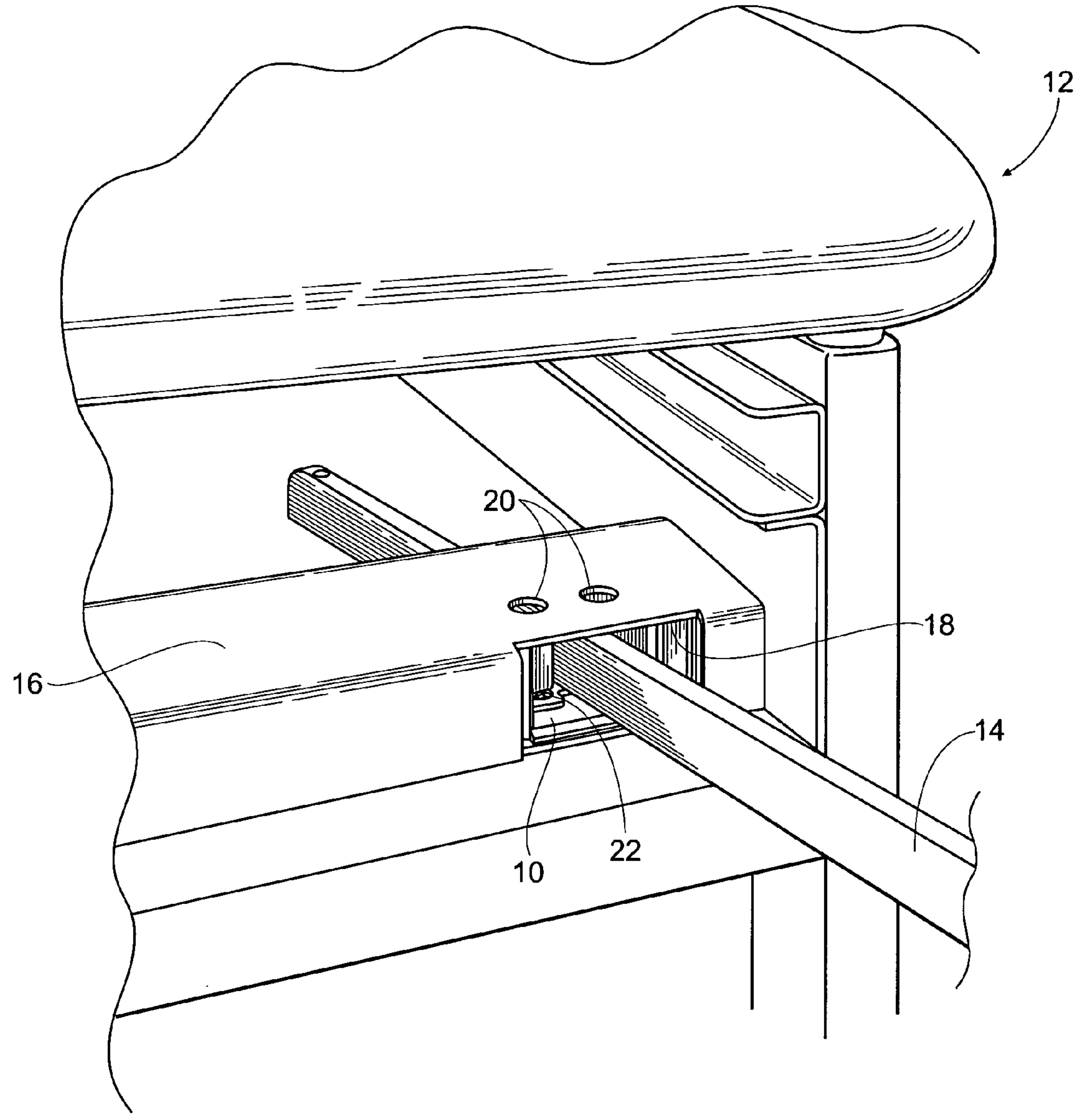
FIG. 1 is a sectional perspective view of the present invention within a medical examining table.

FIG. 1 is a sectional view of an indexer assembly 10, as it would sit within an examination table 12. The indexer supports an extension bar 14 and allows for forward and backward movement of the extension bar 14, as well as lateral rotational movement of the extension bar 14. A cross channel or support channel 16, having an opening 18 approximately the width of the indexer 10, supports the indexer. The support channel 16 may have an inverted U-shaped configuration and may be fastened to the table 12 by welding or other suitable means. A pair of holes 20 are located in the support channel 16. The holes 20, though not part of the present invention, ease installment of the indexer 10 into the table 12. Preferably the indexer 10 is secured with screws 22 or other securing devices that will not interfere with the movement of the extension bar 14. The holes 20 provide access for a drill or screwdriver to secure the screws 22 to the indexer 10 and the table 12.

Figure 2:
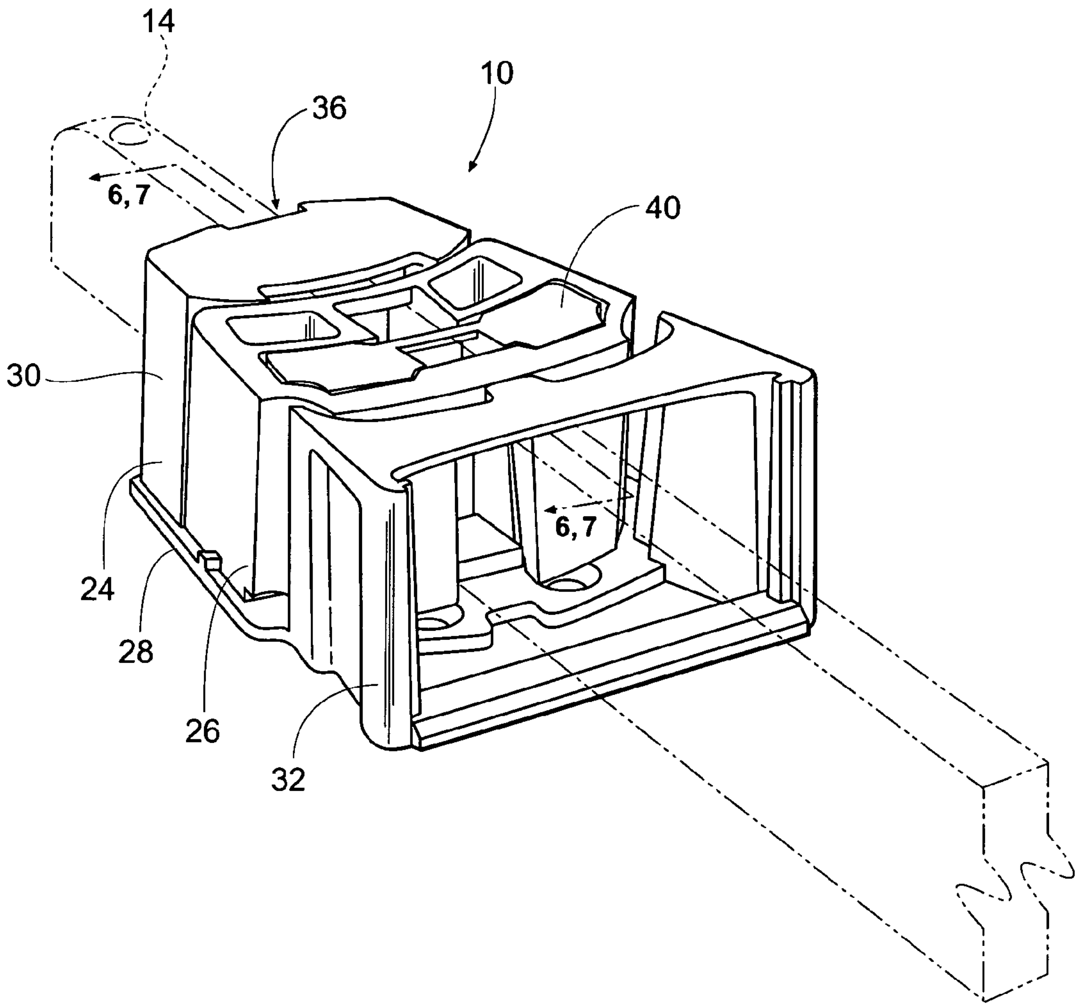
FIG. 2 is a perspective view of the present invention.

FIG. 2 shows a perspective view of the indexer 10. The indexer 10 is comprised of two main sections: a housing unit 24 and an indexer translator 26. The housing 24 comprises a supporting base member 28, which supports a first upright member 30 and a second upright member 32. The upright members 30 and 32 are spaced apart and define a cavity 34 (see FIG. 3). The index translator 26 is slidingly mounted within the housing 24, sitting between the upright members 30 and 32. The extension bar 14 (shown in phantom) rests within a channel 36 that passes through the housing 24 and the translator 26.

Referring to FIGS. 1 and 2, the preferable design of the housing unit 24 has the base member 28 relatively thin. This allows flexibility in the housing unit 24 and provides for tolerance in the manufacturing of the housing 24. For instance, many times the table 12 may be moved and repositioned by grabbing the extension bar 14 and moving the table 12 wheelbarrow style. The base member 28 may flex upwards, causing the upright members 30 and 32 to come in contact with the support channel 16. The base member 28 is strong enough to flex slightly without cracking or breaking in such instances.

Referring to FIG. 2, the housing unit 24 may be designed with only a single upright member, either 30 or 32. For instance, a contemplated design would remove the second upright member 32 and the translator 26 would sit in front of the first upright member 30. Another design may remove the first upright member 30 and have the translator 26 sitting behind the second upright member 32. Provided that there are means sufficient to hold the translator functionally within the indexer 10, any such arrangements fall within the scope of the invention. Likewise, the cavity 34 should be defined broadly. The cavity 34 is the area where the translator 26 is located or placed within the indexer. Thus, if only one upright member 30 or 32 is present in a specific design, the area defined by the single upright member 30 or 32 and the base member 28 would constitute the cavity 34.

Figure 3:
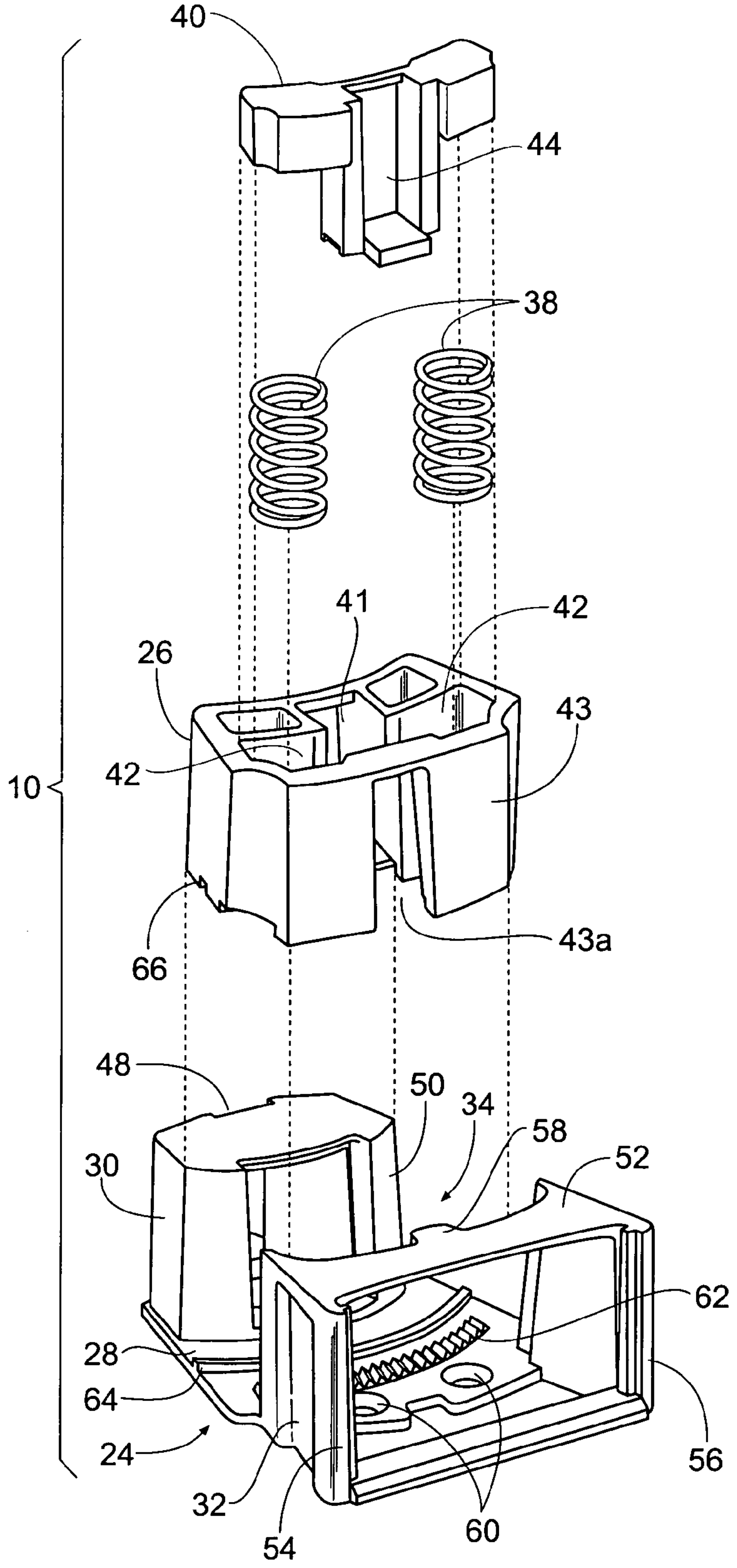
FIG. 3 is an exploded view of the present invention.

FIG. 3 shows an exploded view of the indexer 10. Along with the housing 24 and the translator 26, the indexer 10 comprises a pair of identical coil springs 38 and an indexer retainer 40. The translator 26 further comprises a passage 41 and a chamber 42. The passage 41 and the chamber 42 are transversally arranged with one another, with a common open area shared by both the passage 41 and the chamber 42. It may be possible to design the chamber 42 with separating walls so that the passage 41 and the chamber do not share an open area, but such an arrangement is not necessary for the invention. The chamber 42 holds the coil springs 38 and the indexer retainer 40. The chamber 42 has a front wall 43 with a slot 43*a*. The slot 43*a* allows passage of the extension bar 14 (not shown) through the passage 41. The springs 38 will sit within the chamber 42 between the bottom of the chamber 42 and the indexer retainer 40. The retainer 40 also defines an opening 44, which further defines the channel 36 previously shown and described with relation to FIG. 2.

Figure 3A:
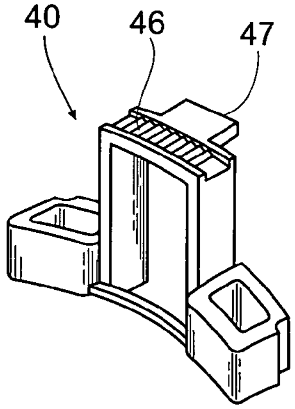
FIG. 3A is an inverted perspective view of a retainer mechanism used in the present invention.

As can be seen in an inverted perspective view in FIG. 3A, the underside of the retainer 40 comprises serrated teeth 46 that form the locking mechanism of the indexer 10. The number of teeth 46 may be more or fewer than shown, provided that the teeth 46 form a sufficient locking mechanism. The retainer 40 also comprises an extending section 47. The extending section 47 helps hold the retainer within the translator 26. The extending section 47 is approximately the width of the slot 43*a* and slidingly mates with the slot 43*a*. This feature prevents the retainer 40 from unwanted side-to-side motion and allows the retainer 40 to be moved together with the translator 26 as a single rotating unit. Also, the area of the extending section 47 is designed to have a maximum surface area that will reduce wear on the section 47 over time.

Referring again to FIG. 3, the housing unit 24 is shown in detail. The first upright member 30 has a passageway 48, which not only defines a portion of the channel 36 (see FIG. 2), but also acts as the theoretical pivot point of the indexer 10 and the extension bar 14 (see FIG. 5). A front side 50 of the first upright member 30 establishes the backside of the cavity 34. The second upright member 32 is further comprised of a top surface 52 and two opposing sidewalls 54 and 56. The top surface 52 retains the extension bar 14 and the translator 26 within the cavity 34. The top surface 52 also limits the degree of upward movement of the extension bar 14 that may be caused from the biasing force of the springs 38. A tab 58 forms a section of the top surface 52 and defines the front of the cavity 34. The tab 58 abuts the front wall 43 of the retainer 26 and prevents the retainer 26 from moving forward and backward. It should be noted that the tab 58 could be of a larger area and extend the entire width of the top surface 52. The sidewalls 54 and 56 of the second upright member 32 establish the limits of the rotational movement of the extension bar 14.

Still referring to FIG. 3, the base member 28 of the housing 24 defines the bottom of the cavity 34. The base member 28 also comprises a pair of through bores 60 that allows the indexer 10 to be attached to an examination table or mount 12 by screws or other fastening devices 22 (see FIG. 1). As previously noted, the tab 58 could extend the width of the top surface 52. However, to maximize the area around the through bores 60 so that there is sufficient area to secure the base member 28 to the table (FIG. 1) without undue stress on the through bores 60, the tab 52 is designed in such a narrow fashion. The design of the tab 58 also allows the housing 24 to be designed as an open and closed mold.

The base member 28 further comprises a row of serrated teeth 62 that are designed to engage and mesh with the serrated teeth 46 of the retainer 40. The serrated teeth 62 are in an arced design, corresponding to the path the translator 26 and retainer 40 will move when the extension bar 14 is pivoted. To help insure that the translator 26 and the retainer 40 move smoothly, an arced track 64 is located on the base member 28. The track 64 is designed to slidingly mate with a groove 66 located on the underside of the translator 26.

The track 64 and groove 66 arrangement further insures that the translator 26 will nest properly within the cavity 34.

Figure 4:
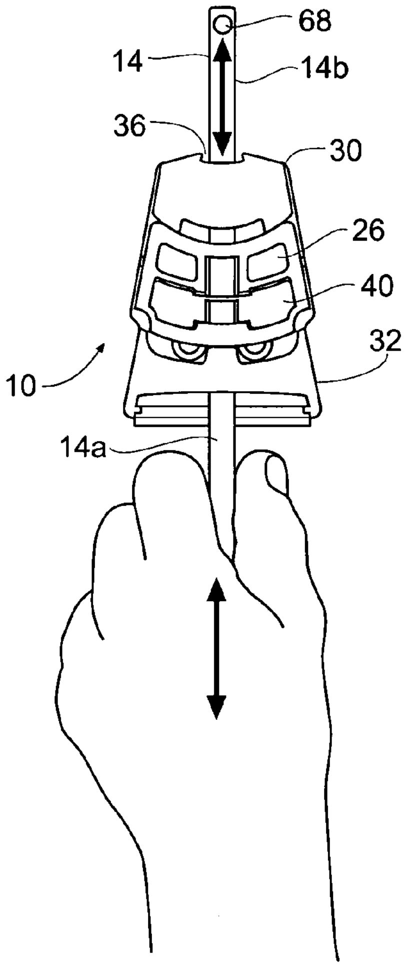
FIG. 4 is an overhead view of the present invention utilized in a forward and backward motion.

Referring now to FIG. 4, an overhead view of the indexer 10 is shown. The extension bar 14 may be pulled forward or pushed backward by grasping and moving its proximate end 14*a*, as indicated by the arrows in FIG. 4. A stop 68 is preferably located at a distal end 14*b* so that the extension bar 14 may not be pulled completely out from an examination table. The stirrup or other device (not shown) attached to the proximate end 14*a* would likewise prevent the extension bar 14 from being pushed completely into the examination table 12. The extension bar 14 can be clearly seen extending through the channel 36 that passes through the first upright member 30, the translator 26, the retainer 40, and the second upright member 32.

Figure 5:
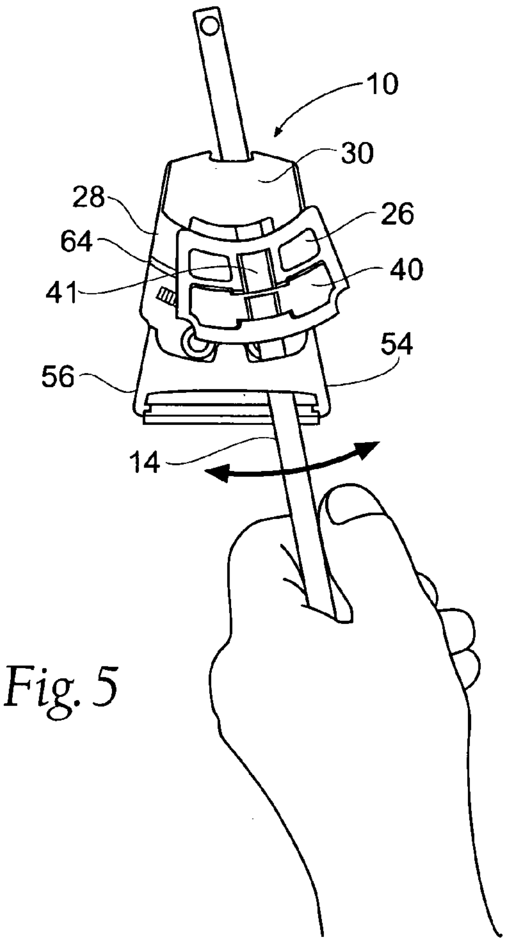
FIG. 5 is an overhead view of the present invention utilized in a rotational motion.

FIG. 5 shows an overhead view of the indexer 10 subjected to rotational force. As indicated by the arrows, the extension bar 14 may be moved side to side, thereby causing the extension bar 14, the translator 26, and the retainer 40 to move together as one unit. The area where the extension bar 14 passes through the first upright member 30 may be generally viewed as the pivot point of the extension bar 14. As previously noted, the translator 26 moves along the track 64 in a uniform fashion. The extension bar 14 is limited in side-to-side motion by the sidewalls 54 and 56.

Figure 6:
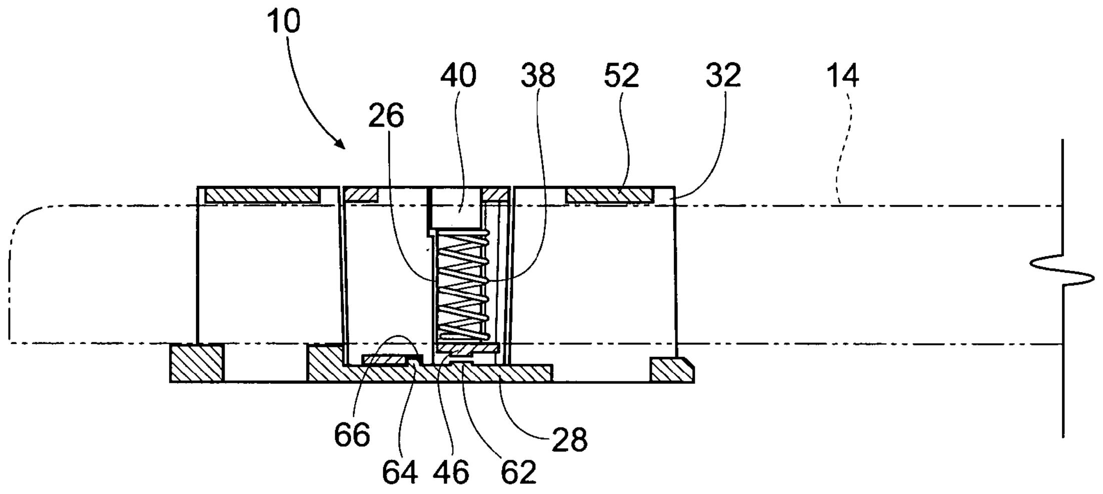
FIG. 6 is a sectional side view of the present invention in a free position taken along line 6—6 of FIG. 2.

FIG. 6 shows a cut-away sectional side view of the indexer 10. FIG. 6 depicts the indexer in a normal position, when the extension bar 14 is not supporting extra weight, such as a patient's limb. The springs 38, which sit within the translator 26, are allowed to exert an upward force, pushing against the retainer 40. The locking teeth 46 located on the bottom of the retainer 40 are pushed clear of the meshing teeth 62 located on the base member 28 and the translator 26 and the extension bar are free to be moved to a desired position. The top surface 52 of the second upright member 32 forms an upper height movement limit for extension bar 14 and prevents the springs 38 from pushing the retainer 40 completely free from the translator 26.

Figure 7:
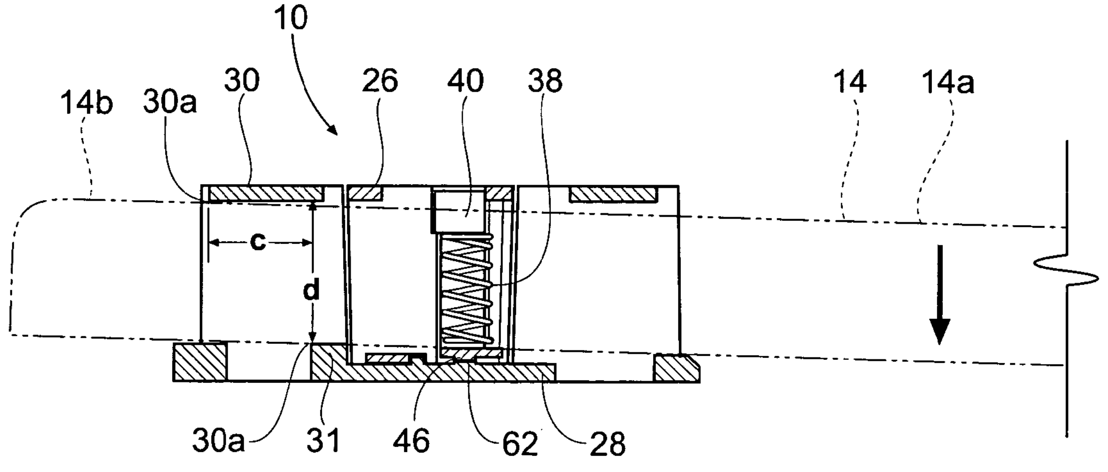
FIG. 7 is a sectional side view of the present invention in a locked position taken along line 7—7 of FIG. 2.

FIG. 7 shows a cut-away sectional side view of the indexer 10 when extra weight or force is applied to the extension bar 14. When a downward force, as indicated by the arrow in FIG. 7, is exerted on the proximate end 14*a* of the extension bar 14, the retainer 40 is also pushed down compressing the springs 38. The teeth 46, which are located on the underside of the retainer 40 are also pushed downward in a direction generally perpendicular to the base member 28. When pushed down, the teeth 46 engage and mesh with the teeth 62. The translator 26 is locked into place, preventing rotational movement. Simultaneously when the force is applied to the proximate end 14*a* of the extension bar 14, the distal end 14*b* of the extension bar 14 moves upward, abutting the topside 30*a* of the first upright member 30 and the distal end 14*b* of the extension bar 14 also contacts the bottom side 30*b* adjacent protrusion 31. The frictional force on the distal end 14*b* between points 30*a* on the topside of the first upright member 30 and 30*b* adjacent the protrusion prevents the extension bar 14 from moving forward or backward and holds the extension bar 14 in place. It will be apparent to one skilled in the art that the frictional locking force is a function of the critical distance c and critical height d.

The extension bar 14 is thus locked into place in both rotational and forward and backward movement. A person may reposition the extension bar 14 by simply lifting the extension bar 14 or relieving the weight (i.e. downward force) on extension bar 14 and moving to the bar 14 to the new desired position.

Figure 8:
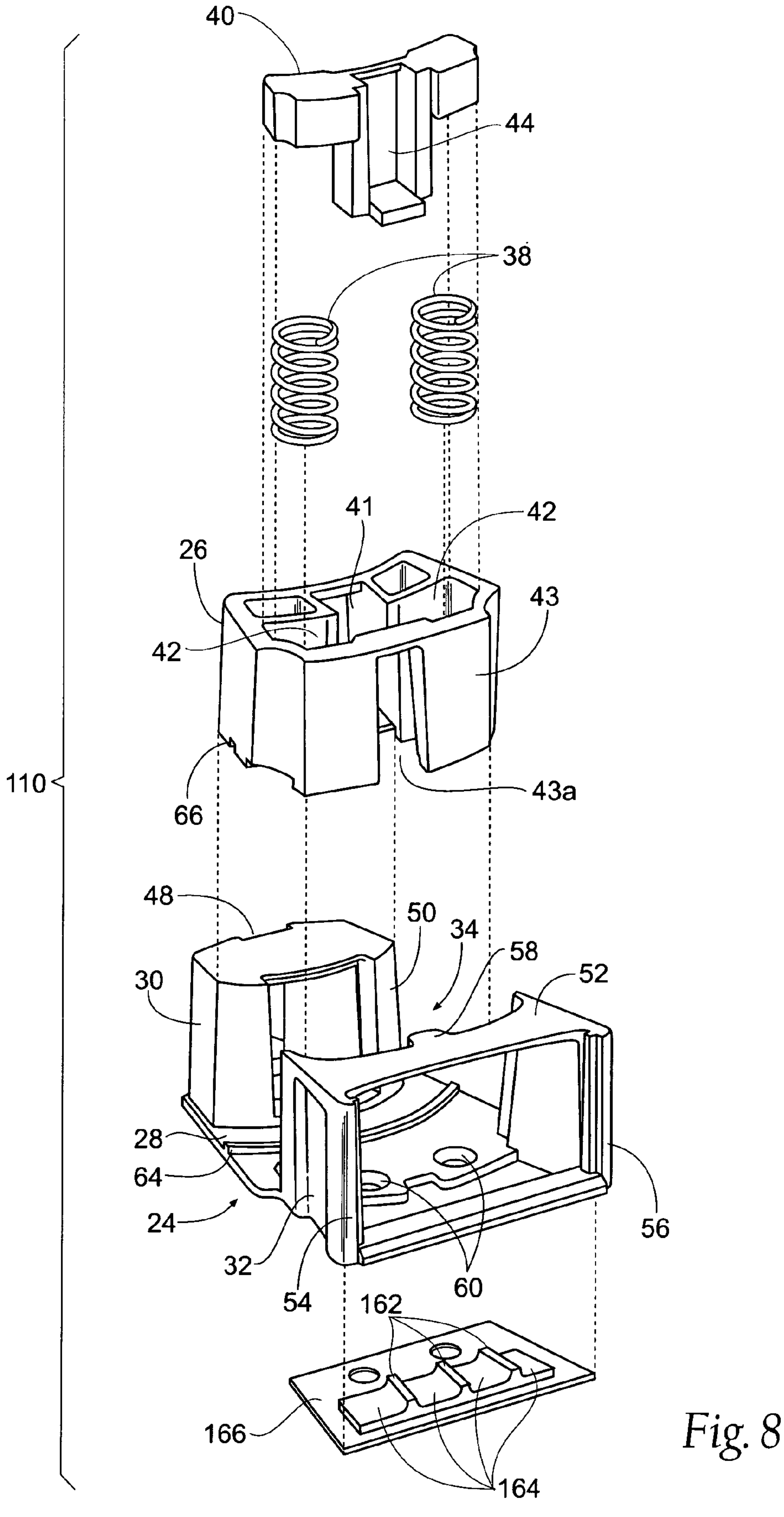
FIG. 8 is an exploded view of a second embodiment of the present invention.

FIG. 8 shows a perspective view of a second embodiment 110 of the present invention. The second embodiment 110 is similar to the first embodiment 10, except the meshing teeth 62 and the serrated teeth 46 are no longer used in the second embodiment. The area along base member 28 of the housing unit 24 is now flat instead of having a serrated locking area 62. The locking mechanism is now formed from a plurality of tines 162 located within the upright member. The tines 162 define a plurality of slots 164 that allows the extension bar 14 to be secured within. The tines 162 and slots 164 are shown to be located on a separate piece 166, but the piece 166 may be formed integral with the housing unit 24.

Figure 9:
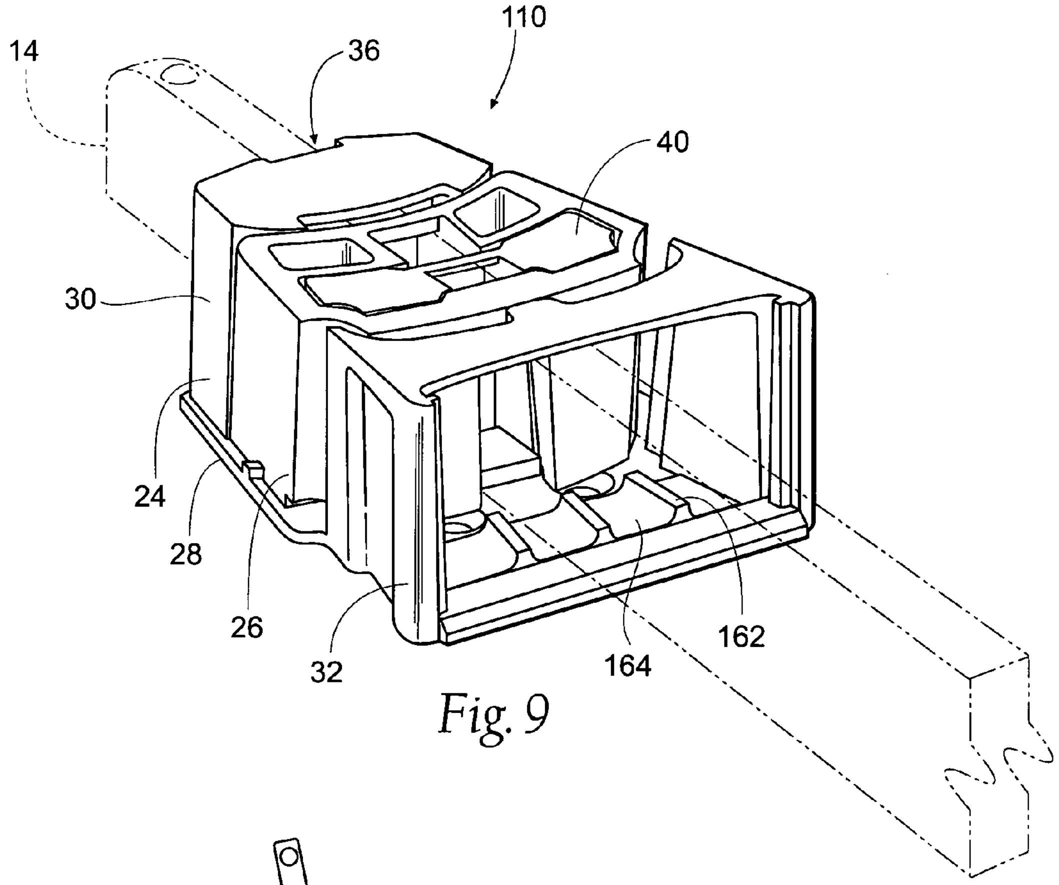
FIG. 9 is a perspective view of the second embodiment of the present invention.

FIG. 9 shows a perspective view of the second embodiment 110. One of the slots 164 defined by two of the tines 162, which prevents side-to-side movement of the extension bar 14, locks the extension bar in place. The forward and rearward locking positioning of the extension bar 14 works in the same manner as previously described with respect to FIG. 6 and 7 and the first embodiment 10.

Figure 9A:
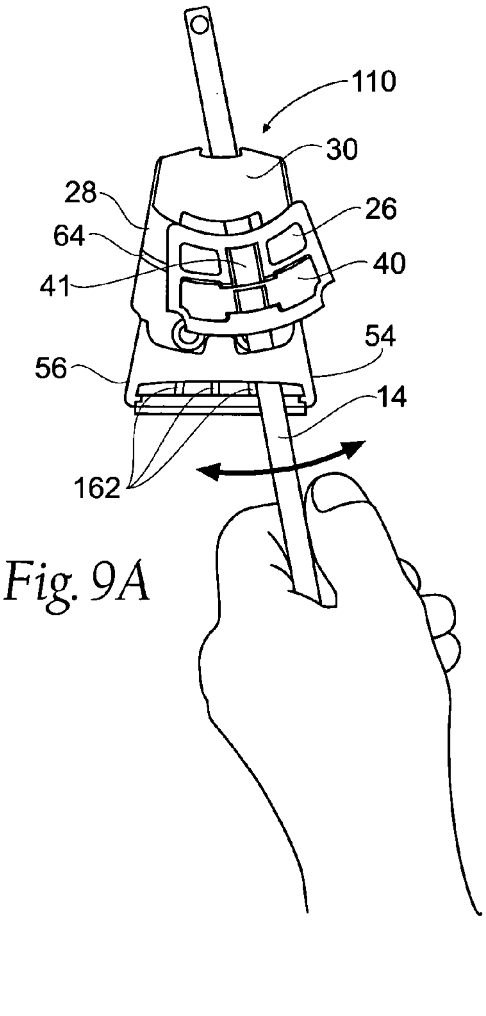
FIG. 9A is an overhead view of the second embodiment of the present invention utilized in a rotational motion.

Referring to FIG. 9A, an overhead view of the second embodiment 110 being rotated is shown. As indicated by the arrows, and as previously described with respect to the first embodiment 10, the extension bar 14 may be lifted and moved side to side, thereby causing the extension bar 14, the translator 26, and the retainer 40 to move together as one unit. The extension bar 14 will be grasped by the user and be lifted over the tines 162. The extension bar 14 may then be set down within another slot 164. Though the second embodiment 110 is designed to have fewer rotated positions than the first embodiment 10, the design of the tines 162 will provide more durability to the locking structure overall.

Figure 10:
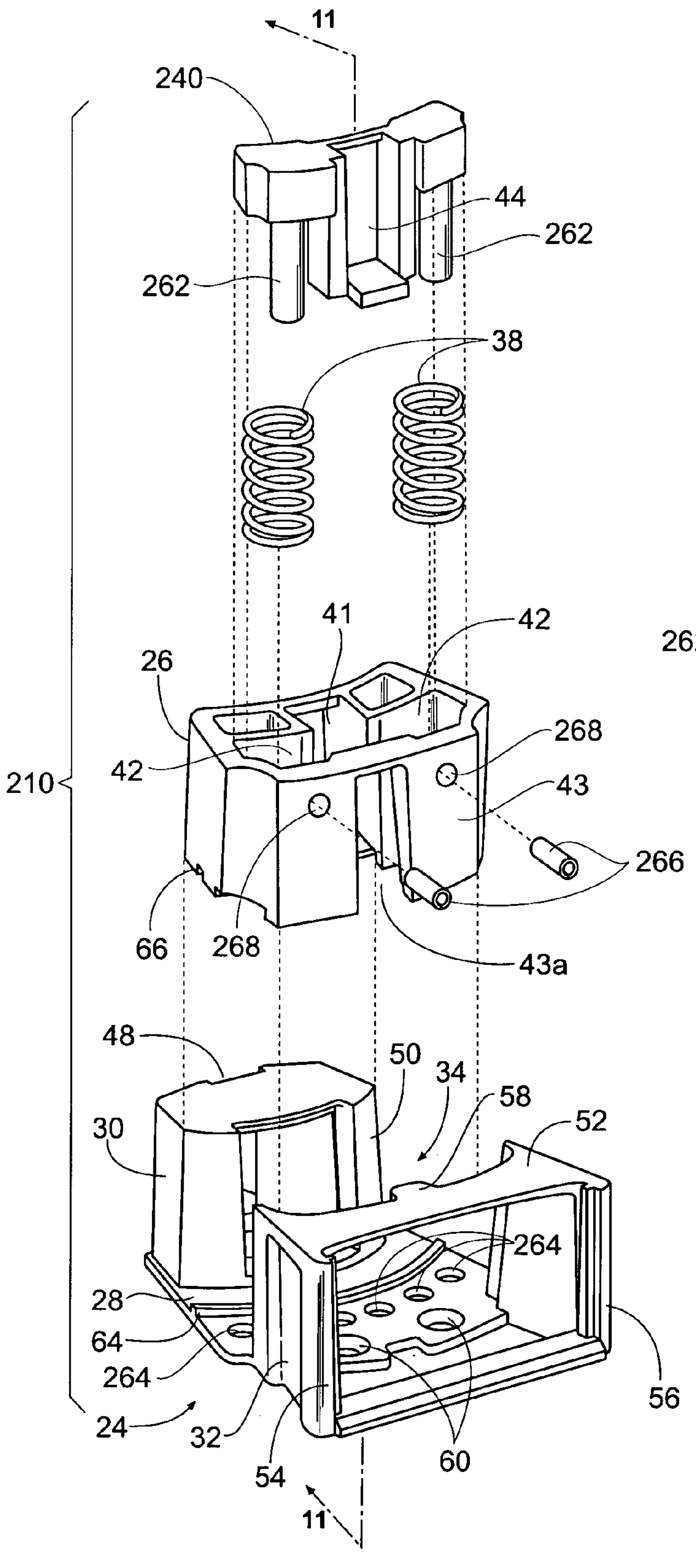
FIG. 10 is an exploded view of a third embodiment of the present invention.

FIG. 10 shows an exploded view of a third embodiment 210 of the present invention. The locking mechanism now consists of a pair of protrusions 262 located on the retainer 240. The protrusions 262 will sit within the coil springs 38 within the retainer 240. The protrusions 262 will lock the third embodiment 210 in predetermined positions by interacting with a plurality of counter bores 264 formed in base member 28. To prevent the springs 38 from providing undue force on the interaction of the protrusions 262 and the counter bores 264, a pin 266 is located within each of the chambers 42 through a pinhole 268 located on the front side 43 of each of the chambers 42.

Figure 10A:
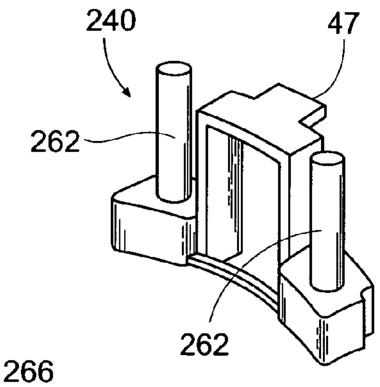
FIG. 10A is an inverted perspective view of a retainer mechanism used in conjunction with the third embodiment of the present invention.

FIG. 10A is an inverted perspective view of the retainer 240 used in the third embodiment 210. The retainer 240 has the protrusions 262 located on each side of the retainer 240. While the retainer 240 may be designed with a single protrusion 262, the use of two protrusions provides for more balanced locking ability of the indexer 210 overall.

Figure 11:
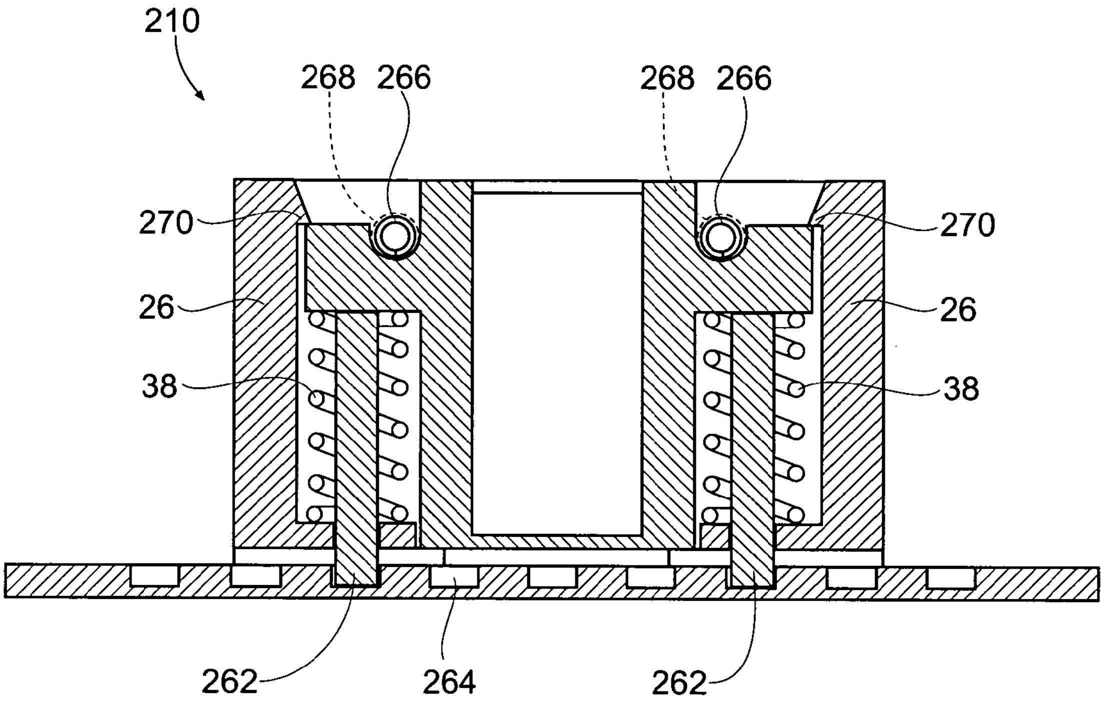
FIG. 11 is a cross-sectional view of the embodiment of FIG. 10 taken along line 11—11 of FIG. 10.

FIG. 11 is a cut-away view of the third embodiment 210. The projections 262 are shown in a locked position by interacting with two of the counter bores 264. As noted previously, the pins 266 rest within the pinholes 268 of the retainer 240 to allow for a maximum upward movement of the springs 38, which also limits the maximum force exerted by the springs 38 and lessens the interacting force of the projections 262 and the counter bores 264. Such a design is advantageous so that not as much force is needed to move the indexer 210 from one position to another. The translator 26 may also contain a pair of lips 270, which will further hold the retainer 240 in place. The lips 270 are ramped so that the retainer 240 may be easily slid down into the chamber 42.

In designing the housing unit 24, attention should be given to the dimensions of the first upright member 30. Generally the proximal upper end 30*a* should be relatively close together linearly the distal bottom end 30*b*. That is the ratio of the first upright member 30 height H should not be substantially greater than the width W from 30*a* to 30*b*. If the ratio of H/W is too great, there will not be sufficient friction to lock the bar 14 in place when pressure is applied. This would also apply if there was only one upright member within the housing 24.

The springs 38 may be of any desired tension proportional to the force needed to retain the extension bar 14 in a free position. More or fewer springs 38 may be used in the invention, but two springs provide an optimal balance of weight and pressure for the device. While identical springs are preferred, the pair of springs 38 may be of different configurations. Similarly, different styles of biasing means or springs may be used, provided they supply a sufficient biasing force. It may also be desired that no springs or biasing means are used in the invention. In such a case the normal position of the extension bar 14 and the translator 26 would be in a locked position with the teeth 46 on the retainer 40 meshing with the teeth 62 on the base member 28 of the housing unit 24. Also, the size and shape of the teeth may be modified to provide more or less locking resistance. Likewise, other locking means, such as a friction pad, may be used in place of the meshing teeth that would lock the translator 26 in place with the base member 28.

The base of the indexer is preferably made of a compound or material with good compression strength, such as a die cast metal, molded plastic, or cut metal. The translator may be made of any strong material that will slide and move easily, also of such nature as a die cast metal, molded plastic, or cut metal. However, provided that the materials are durable and will support an extension bar, any materials will suffice. The housing, the translator, and the retainer are all preferably molded as single pieces. However, it is contemplated that the sections may be made of more than one type of material. For example, the housing may be designed of two sections that would snap or lock together in place.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An indexer for use with a limb support bar extending from a mount, the indexer comprising:

a housing unit including a supporting base member, said base member having at least one upright member, said upright member defining a cavity;

an indexer translator rotationally mounted within said cavity, said translator directing rotational movement of said limb support bar, said translator including a chamber, said chamber arranged to receive a locking member;

said locking member being movable in a plane substantially perpendicular to said base member, said base member and said locking member each including means for retaining said translator in a predetermined rotational position;

biasing means for normally separating said indexer translator and said locking member; and a channel for retaining said limb extension bar, said channel passing through said housing unit, said indexer translator, and said locking member.

2. The indexer according to claim 1 wherein said biasing means further comprises at least one spring.

3. The indexer according to claim 1 further comprising a track located on said base member, said track providing guide means for rotational movement of said translator.

4. The indexer according to claim 1 wherein a topside of said upright member provides frictional force against said extension bar, said frictional force allowing said extension bar to be locked in an extended position.

5. The indexer according to claim 1 wherein said means for retaining said translator comprise meshing teeth.

6. The indexer according to claim 1 wherein said means for retaining said translator comprises a plurality of tines.

7. The indexer according to claim 1 wherein said base member comprises a pair of spaced apart upright members, said upright members forming said cavity therebetween.

8. The indexer according to claim 1 wherein said base member is stationary.

9. An indexer for use with a limb support bar extending from a mount, the indexer comprising:

a housing unit including a supporting base member, said base member having at least one upright member, said upright member defining a cavity;

an indexer translator rotationally mounted within said cavity, said translator directing rotational movement of said limb support bar, said translator including a chamber, said chamber arranged to receive a locking member;

said locking member being movable in a plane substantially perpendicular to said base member, said base member and said locking member each including means for retaining said translator in a predetermined rotational position, said retaining means normally in a locked position; and a channel for retaining said limb extension bar, said channel passing through said housing unit, said indexer translator, and said locking member.

10. The indexer according to claim 9 further comprising a track located on said base member, said track providing guide means for rotational movement of said translator.

11. The indexer according to claim 9 wherein a topside of said upright member provides frictional force against said extension bar, said frictional force allowing said extension bar to be locked in an extended position.

12. The indexer according to claim 9 wherein said means for retaining said translator comprise meshing teeth.

13. The indexer according to claim 9 wherein said means for retaining said translator comprises a plurality of tines.

14. The indexer according to claim 9 wherein said base member comprises a pair of spaced apart upright members, said upright members forming said cavity therebetween.

15. The indexer according to claim 9 wherein said base member is stationary.

* * * * *